United States Patent [19]

Lorenz

[11] Patent Number: 5,065,546
[45] Date of Patent: Nov. 19, 1991

[54] GRINDING WHEEL FOR PRODUCING INTERNAL PROFILINGS

[75] Inventor: Manfred Lorenz, Coburg, Fed. Rep. of Germany

[73] Assignee: Kapp GmbH, Coburg, Fed. Rep. of Germany

[21] Appl. No.: 518,912

[22] Filed: May 4, 1990

[30] Foreign Application Priority Data

Sep. 7, 1989 [EP] European Pat. Off. ........ 89116534.2

[51] Int. Cl.$^5$ ............................................. B24B 5/00
[52] U.S. Cl. ................................. 51/134.5 R; 51/266
[58] Field of Search .............................. 51/134.5, 266

[56] References Cited

U.S. PATENT DOCUMENTS 2,456,753 12/1948 Swanee ..................... 51/134.5

FOREIGN PATENT DOCUMENTS

| 0182158 | 5/1986 | European Pat. Off. . |
| 620052 | 10/1935 | Fed. Rep. of Germany . |
| 2552259 | 6/1977 | Fed. Rep. of Germany . |
| 3624472 | 1/1988 | Fed. Rep. of Germany . |
| 2332100 | 10/1976 | France . |
| 56-134129 | 10/1981 | Japan . |
| 57-83320 | 5/1982 | Japan . |
| 1057420 | 2/1967 | United Kingdom . |

Primary Examiner—M. Rachuba
Attorney, Agent, or Firm—Robert W. Becker & Associates

[57] ABSTRACT

A grinding wheel for producing internal profilings is provided. A grinding disk is disposed at the front end of a rod-like grinding machine arm at the respective angle of slope of the internal profiling that is to be produced. The grinding disk is adapted to be driven by a drive shaft, which is disposed at the other end of the arm, via a drive that extends through the arm. In order, with a simple construction and the use of a disk having a profile that corresponds to the internal profiling that is to be produced, to make it possible to set the grinding disk to the respective angle of slope of the internal profiling that is to be produced, the drive includes a belt that is disposed in the arm and that via respective belt pulleys connects the drive shaft with an intermediate shaft mounted in the front end of the arm. The grinding disk is disposed on a spindle that can be driven by the intermediate shaft via a pair of gear wheels and that, via its bearings, is mounted on the arm in such a way as to be pivotable about the center point of the gear wheel that is disposed on the intermediate shaft.

4 Claims, 1 Drawing Sheet

GRINDING WHEEL FOR PRODUCING INTERNAL PROFILINGS

BACKGROUND OF THE INVENTION

The present invention relates to a grinding wheel for producing internal profilings, especially of internally located helical teeth or gearings, and including a grinding disk that is disposed at a front end of a rod-like grinding machine arm at the respective angle of slope of the internal profiling that is to be produced, with the grinding disk being adapted to be driven by a drive shaft, which is disposed at the other end of the arm, via drive means that extends through the arm.

Various grinding wheel constructions are known for producing internal profilings. For example, German Patent 25 52 259 discloses a grinding machine arm for grinding internally located, axially extending profilings, with the grinding disk being disposed on a shaft that extends perpendicular to the longitudinal axis of the arm, is fixedly mounted in the enclosed arm, and is driven by a toothed belt. European patent application 182 158 discloses a similar grinding machine arm, the grinding disk of which, however, is driven by a shaft, which extends longitudinally in the arm, via a worm gear. Unfortunately, with this known construction, it is essentially possible to grind only axially extending internal profilings or profilings that are inclined at a slight angle to the longitudinal axis.

In order to also be able to grind internally located helical teeth or gearings, grinding machine arms are known where the grinding disk is disposed at the end of a spindle that extends axially in the arm. By tilting the arm relative to the longitudinal axis of the workpiece, it is also possible to grind internal profilings that extend at an angle to the longitudinal axis of the workpiece, such as helical teeth or gearings. A grinding wheel construction of this type is disclosed, for example, in the Japanese publication 56-134 129.

If helical teeth are to be ground into workpieces that have a large axial extent but a small inner diameter, the problem results that the grinding machine arm, due to its inclination relative to the longitudinal axis of the workpiece, collides with the wall of the workpiece that is to be machined if the grinding is also to be accomplished at greater workpiece depths. To resolve this problem, two different types of construction are known.

On the one hand, it is possible to introduce the spindle into the workpiece either concentrically or at a grinding angle that is less than the angle of slope of the internal profiling that is to be ground. The difference between the angle of slope that is to be ground and the grinding angle that is formed between the longitudinal axis of the workpiece and the spindle is compensated for by a correction of the grinding disk profile. Grinding wheels of this type are disclosed in Japanese publication 57-83 320 and in German Offenlegungsschrift 36 24 472.

The second approach for resolving the aforementioned problem during the production of internally located helical teeth is to dispose the grinding disk at the front end of the rod-like grinding machine arm at the respective angle of slope of the internal profile that is to be produced. This approach is disclosed in Great Britain Patent 1 057 420, where the grinding disk is provided with exactly the profile that is to be ground on the workpiece, so that no correction of the profile is required. With this known construction, the drive for the grinding disk is effected via a shaft that extends longitudinally in the rod-like arm, and that at its front end drives the grinding disk, which is disposed on a hub-like carrier element, via a type of universal coupling.

In addition to the fact that such a drive of the grinding disk via a universal coupling does not make it possible to realize the modern high speeds of such grinding disks, the construction known from the Great Britain Patent 1 057 420 has the drawback that in order to conform the grinding disk to the respective angle of slope of the internal profiling that is to be produced, the entire grinding wheel must be disassembled in order to exchange a bearing sleeve that provides the respective tilt of the grinding disk for a similar sleeve that has a different angle of slope.

Starting from the aforementioned known construction of Great Britain Patent 1 057 420, it is an object of the present invention to provide a grinding wheel to produce internal profilings of the aforementioned type, whereby the grinding disk, which is provided with an uncorrected profile, can be adapted to the respective angle of slope of the internal profiling that is to be produced without disassembling the grinding wheel, and whereby the grinding wheel can also be driven at high speeds with little energy loss.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

Figure 2:
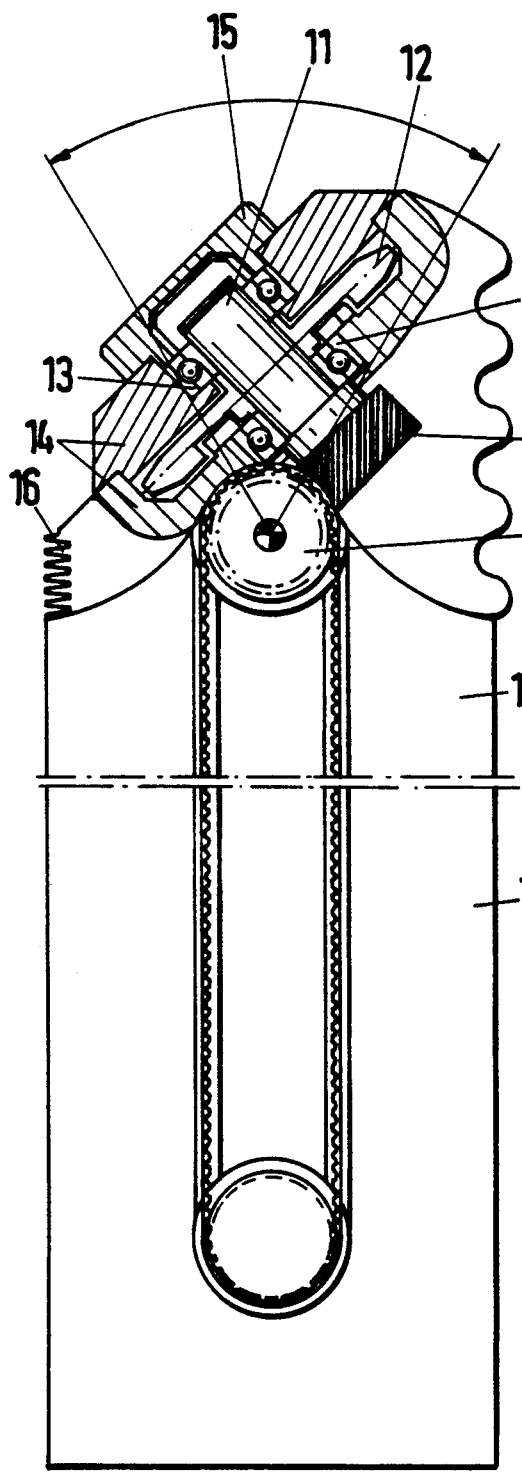
FIG. 2 is a partially cross-sectioned elevational view of the grinding wheel of FIG. 1.

The grinding wheel of the present invention is characterized primarily in that the drive means of the grinding wheel, which is disposed on the front end of the rod-like grinding machine arm, includes a belt that extends within the arm and that via respective belt pulleys connects the drive shaft with an intermediate shaft that is disposed in the front end of the arm, and in that the grinding wheel is disposed on a spindle that can be driven by the intermediate shaft via a pair of gear wheels and that via its bearing means is mounted on the arm in such a way that it is pivotable about the center point of the gear wheel that is disposed on the intermediate shaft.

By means of this inventive proposal, a grinding wheel for producing internal profilings, especially internally located helical teeth or gearings, is provided, with the grinding disk thereof being embodied with a profile that corresponds to the respective profiling that is to be produced, with this grinding disk also being capable of being driven at high speeds in a low-loss manner. By pivoting the spindle that carries the grinding disk relative to the arm, the grinding disk can be adapted in a simple manner to the angle of slope of the respective internal profiling that is to be produced, without such a measure requiring any kind of disassembly. Thus, the inventive proposal results in a grinding wheel that in addition to having a low-loss drive means due to its straightforward construction, makes it possible to easily and rapidly adapt the tilt of the grinding disk to the angle of slope of the respective internal profiling that is to be produced.

Pursuant to one preferred specific embodiment of the inventive grinding wheel, the belt is embodied as a toothed belt. Furthermore, the gear wheels that connect the intermediate shaft with the spindle can be embodied as helical gears or bevel gears.

In order also at high speeds to be able to ensure a reliable operation of the inventive grinding wheel, a fresh-oil cooling means is provided for supplying cooling oil or other coolant, via compressed air, to the bearings of the intermediate shaft and the spindle, as well as to the gear wheels.

Further specific features of the present invention will be described in detail subsequently.

DESCRIPTION OF THE PREFERRED EMBODIMENTS

Referring now to the drawing in detail, the grinding wheel includes an arm 1 that is to be secured to a non-illustrated grinding machine. The arm 1 has a rod-like configuration and is shown shortened in order to facilitate illustration. Rotatably mounted at one end of the arm 1, via a double-row ball bearing 3, is a drive shaft 2 on which is secured a belt pulley 4.

An intermediate shaft 6 is rotatably mounted via two ball bearings 5 in the other end of the arm 1. The intermediate shaft 6 extends parallel to the drive shaft 2, and similarly carries a belt pulley 7. The two belt pulleys 4 and 7 are interconnected by a belt 8, which is preferably in the form of a toothed belt.

Secured on the intermediate shaft 6 is a gear wheel 9, which is embodied as a helical gear or a bevel gear. As can be seen in FIG. 2, a further gear wheel 10 meshes with the gear wheel 9 In conformity with the gear wheel 9, the gear wheel 10 is embodied as a helical gear or a bevel gear.

The gear wheel 10 is in turn secured on a spindle 11 that carries a grinding disk 12. The spindle 11 is rotatably mounted via two ball bearings 13 in a bearing element 14 that is mounted on the arm 1 in such a way as to be pivotable about the center point of the gear wheel 9 that is disposed on the intermediate shaft 6. The pivotability of the bearing element 14 relative to the arm 1 is indicated by the double arrow in FIG. 2. FIG. 2 furthermore shows that the bearing element 14 comprises two parts, and is in addition provided with a cover means 15 to cover the outer ball bearing 13. As shown in FIG. 2, disposed between the bearing element 14 and the arm 1 is a bellows 16 that on the one hand prevents shavings and dirt from entering the interior of the arm 1, and on the other hand prevents an undesired escape of cooling oil or other coolant that is conveyed via compressed air to the bearings 5 of the intermediate shaft 6, to the bearings 13 of the spindle 11, and to the gear wheels 9 and 10.

As a consequence of the pivotability of the bearing element 14, which supports the spindle 11 with the grinding disk 12, relative to the arm 1, it is possible to set the grinding disk 12 to the respective angle of slope of the internal profiling that is to be produced via means that are not illustrated in the drawing. Since the pivotal movement is effected about the center point of the gear wheel 9 that is disposed on the intermediate shaft 6, i.e. about the axis of rotation of the intermediate shaft 6, no change occurs in the meshing between the gear wheels 9 and 10. Thus, it is merely necessary to set the bearing element 14 to the respectively required angle of slope, and to secure the same in the selected position.

Figure 1:
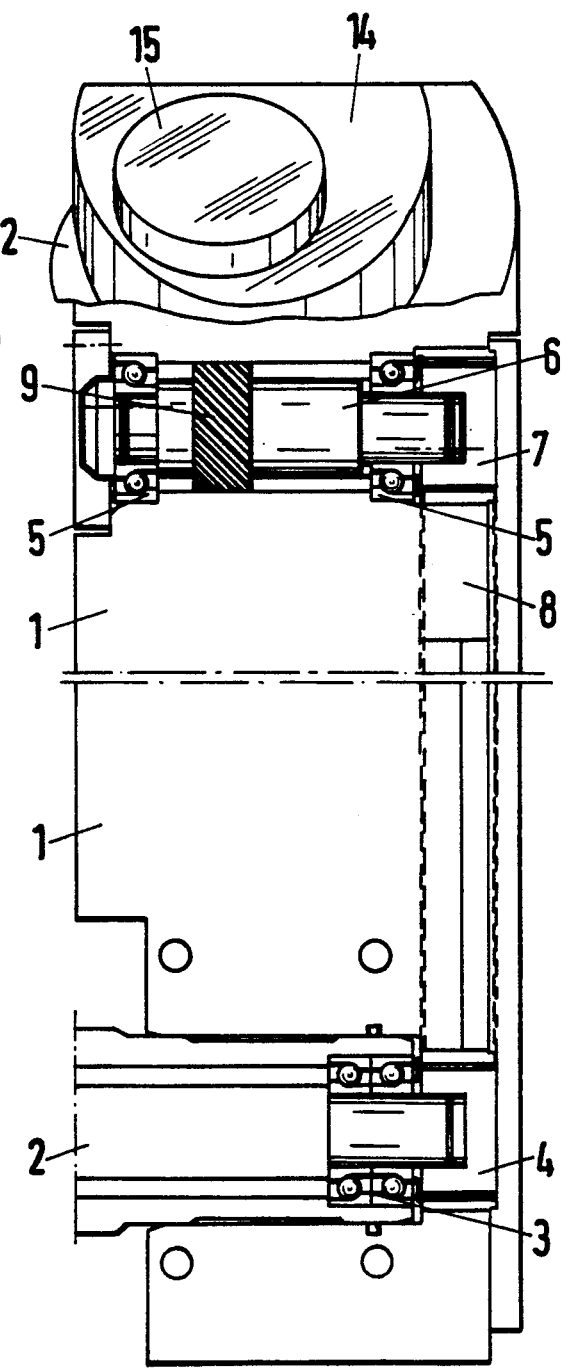
FIG. 1 is a partially cross-sectioned side view of one exemplary embodiment of the inventive grinding wheel.

As can be seen from the schematic views of the embodiment illustrated in FIGS. 1 and 2, the grinding wheel of the present invention comprises a small number of straightforward components, whereby it is possible to reliably mount not only the spindle 11 but also the intermediate shaft 6, so that high speeds of the grinding disk 12 can be achieved with the grinding wheel of the present invention. The toothed belt that is used between the drive shaft 2 and the intermediate shaft 6 for driving the shaft 6 represents a low-loss transfer of the rotational movement of the drive shaft 2 to the intermediate shaft 6, and can be accommodated in a space-saving manner in the interior of the arm 1, which can thus on the whole have a small cross-sectional configuration, so that internal profilings can also be machined in workpieces that have small inner diameters and great depths, with this being possible at any desired angle of slope of the internal profiling that is to be produced, especially for helical teeth or gearings.

The present invention is, of course, in no way restricted to the specific disclosure of the specification and drawing, but also encompasses any modifications within the scope of the appended claims.

What I claim is:

1. In a grinding wheel for producing internal profilings, and including a grinding disk that is disposed at a front end of a rod-like grinding machine arm at the respective angle of slope of the internal profiling that is to be produced, with said grinding disk being adapted to be driven by a drive shaft, which is disposed at the other end of said arm, via drive means that extends through said arm, the improvement wherein said drive means comprises:

a first belt pulley connected to said drive shaft;
   an intermediate shaft disposed in said front end of said arm;
   a second belt pulley connected to said intermediate shaft;
   a belt disposed within said arm and interconnecting said first and second belt pulleys and hence said drive shaft and said intermediate shaft;
   a spindle on which said grinding disk is mounted;
   a first gear wheel disposed on said intermediate shaft;
   a second gear wheel disposed on said spindle, with said first and second gear wheels forming an intermeshing pair of gear wheels that provides a driving connection between said intermediate shaft and said spindle; and
   bearing means for disposing said spindle on said arm so that said spindle is pivotable about a center point of said first gear wheel on said intermediate shaft, said grinding disk provided with an uncorrected profile that can be adapted to the respective angle of slope of internal profiling that is to be produced without disassembling the grinding wheel such that the grinding disk can be driven at high speeds with little energy loss.

2. A grinding wheel according to claim 1, in which said belt is a toothed belt.

3. A grinding wheel according to claim 2, in which said first and second gear wheels are embodied as helical gears.

4. A grinding wheel according to claim 2, in which said first and second gear wheels are embodies as bevel gears.

* * * * *